United States Patent
Duda et al.

(10) Patent No.: US 9,747,937 B1
(45) Date of Patent: Aug. 29, 2017

(54) MULTI-PURPOSE RESISTIVE SENSOR FOR A HEAT-ASSISTED MAGNETIC RECORDING DEVICE

(71) Applicant: Seagate Technology LLC, Cupertino, CA (US)

(72) Inventors: John Charles Duda, Bloomington, MN (US); Zoran Jandric, St. Louis Park, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 15/342,326

(22) Filed: Nov. 3, 2016

(51) Int. Cl.
| | |
|---|---|
| *G11B 5/74* | (2006.01) |
| *G11B 11/00* | (2006.01) |
| *G11B 5/60* | (2006.01) |
| *G11B 5/48* | (2006.01) |
| *G11B 5/00* | (2006.01) |

(52) U.S. Cl.
CPC .......... *G11B 5/6082* (2013.01); *G11B 5/4866* (2013.01); *G11B 2005/0021* (2013.01)

(58) Field of Classification Search
CPC .......... G11B 5/3903; G11B 2009/0005; G11B 5/607; G11B 5/6094; G11B 22/14; G11B 33/1406; G11B 5/40; G11B 5/4853; G11B 33/1433; G11B 5/3945; G11B 2005/021; G11B 5/4886; G11B 5/314
USPC .................... 360/59, 31, 30, 66, 234.5, 313; 369/13.33, 13.34, 13.13
See application file for complete search history.

(56) References Cited

U.S. PATENT DOCUMENTS

| | | |
|---|---|---|
| 8,705,323 B2 | 4/2014 | Contreras et al. |
| 8,810,947 B1 | 8/2014 | Ren et al. |
| 8,842,507 B1 * | 9/2014 | Hirano ................. G11B 5/1278 369/112.27 |
| 8,908,483 B1 | 12/2014 | Ren et al. |
| 9,030,773 B2 | 5/2015 | Macken et al. |
| 9,042,210 B2 | 5/2015 | Macken et al. |
| 9,047,926 B2 | 6/2015 | Contreras et al. |
| 9,177,577 B2 | 11/2015 | Macken et al. |
| 9,202,499 B2 | 12/2015 | Kiely et al. |
| 2011/0299367 A1 | 12/2011 | Naniwa et al. |
| 2012/0051196 A1 | 3/2012 | Grobis et al. |
| 2013/0286802 A1 | 10/2013 | Kiely |
| 2014/0269238 A1 | 9/2014 | Kautzky et al. |

OTHER PUBLICATIONS

U.S. Appl. No. 15/007,772, filed Jan. 27, 2016, Duda et al.

* cited by examiner

*Primary Examiner* — Nabil Hindi
(74) *Attorney, Agent, or Firm* — Hollingsworth Davis, LLC

(57) ABSTRACT

An apparatus comprises a slider having an air bearing surface (ABS) and a near-field transducer (NFT) at or near the ABS. An optical waveguide is configured to couple light from a laser source to the NFT. A resistive sensor comprises an ABS section situated at or proximate the ABS and a distal section extending away from the ABS to a location at least lateral of or behind the NFT. The resistive sensor is configured to detect changes in output optical power of the laser source and contact between the slider and a magnetic recording medium.

20 Claims, 14 Drawing Sheets

MULTI-PURPOSE RESISTIVE SENSOR FOR A HEAT-ASSISTED MAGNETIC RECORDING DEVICE

SUMMARY

Embodiments are directed to an apparatus comprising a slider having an air bearing surface (ABS) and a near-field transducer (NFT) at or near the ABS. An optical waveguide is configured to couple light from a laser source to the NFT. A resistive sensor comprises an ABS section situated at or proximate the ABS and a distal section extending away from the ABS to a location at least lateral of or behind the NFT. The resistive sensor is configured to detect changes in output optical power of the laser source and contact between the slider and a magnetic recording medium.

Other embodiments are directed to an apparatus comprising a slider having an ABS, a write pole with a write pole tip at the ABS, and an NFT at or near the ABS adjacent the write pole. An optical waveguide is configured to couple light from a laser source to the NFT. A resistive sensor comprises an ABS section and a distal section. The ABS section comprises a first ABS section spaced apart from a second ABS section in a cross-track direction. The NFT is situated between the first and second ABS sections. The distal section at least partially surrounds the NFT and is connected to the first and second ABS sections.

The above summary is not intended to describe each disclosed embodiment or every implementation of the present disclosure. The figures and the detailed description below more particularly exemplify illustrative embodiments.

BRIEF DESCRIPTION OF THE DRAWINGS

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

The present disclosure generally relates to heat-assisted magnetic recording (HAMR), also referred to as energy-assisted magnetic recording (EAMR), thermally-assisted magnetic recording (TAMR), and thermally-assisted recording (TAR). This technology uses a laser source and a near-field transducer (NFT) to heat a small spot on a magnetic disk during recording. The heat lowers magnetic coercivity at the spot, allowing a write transducer to change the orientation of a magnetic domain at the spot. Due to the relatively high coercivity of the medium after cooling, the data is less susceptible to paramagnetic effects that can lead to data errors.

In general, HAMR uses laser to heat magnetic media near or above the Curie temperature during recording. Stability of the laser power is important for recording performance since write width, magnetic transition location, and effective write field gradient highly depends on laser power. However, laser power stability is very challenging for HAMR due to various factors, including space limitations, high power density, strong optical feedback, and large environmental temperature variations.

Conventional methods of measuring laser power variation are not accurate, not directly related to recording performance, and difficult to provide specification. For example, methods that use bit error rate (BER) loss at high duty cycle recording assume that laser power variation at low duty cycle is smaller than at high duty cycle; this assumption is not always true. Methods that use an internal photodiode assume laser power at the front facet of the laser correlates with that at the back facet; this correlation varies with head design. A method that uses track average amplitude (TAA) variation can be impacted by media variation, and is difficult to provide specification.

Figure 1:
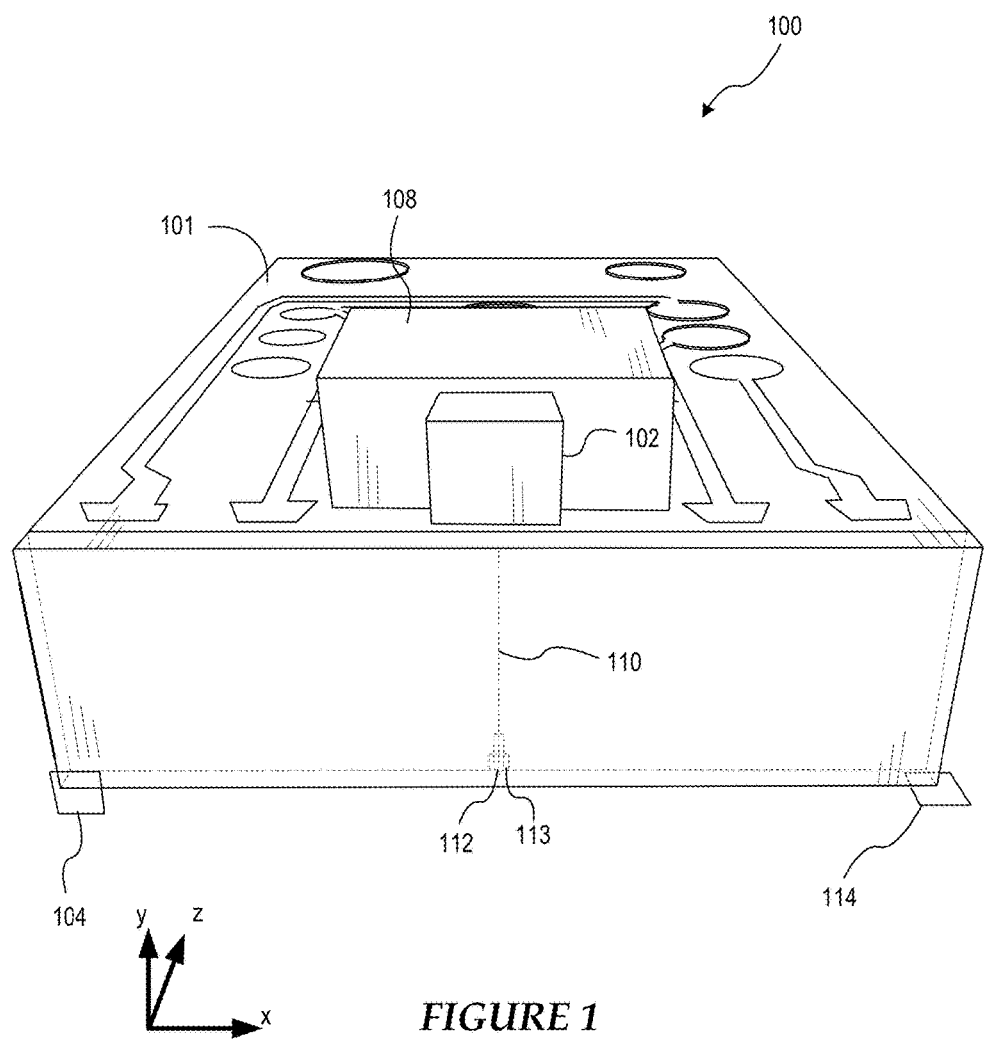
FIG. 1 is a perspective view of a HAMR slider with which various embodiments disclosed herein may be implemented.
Figure 2:
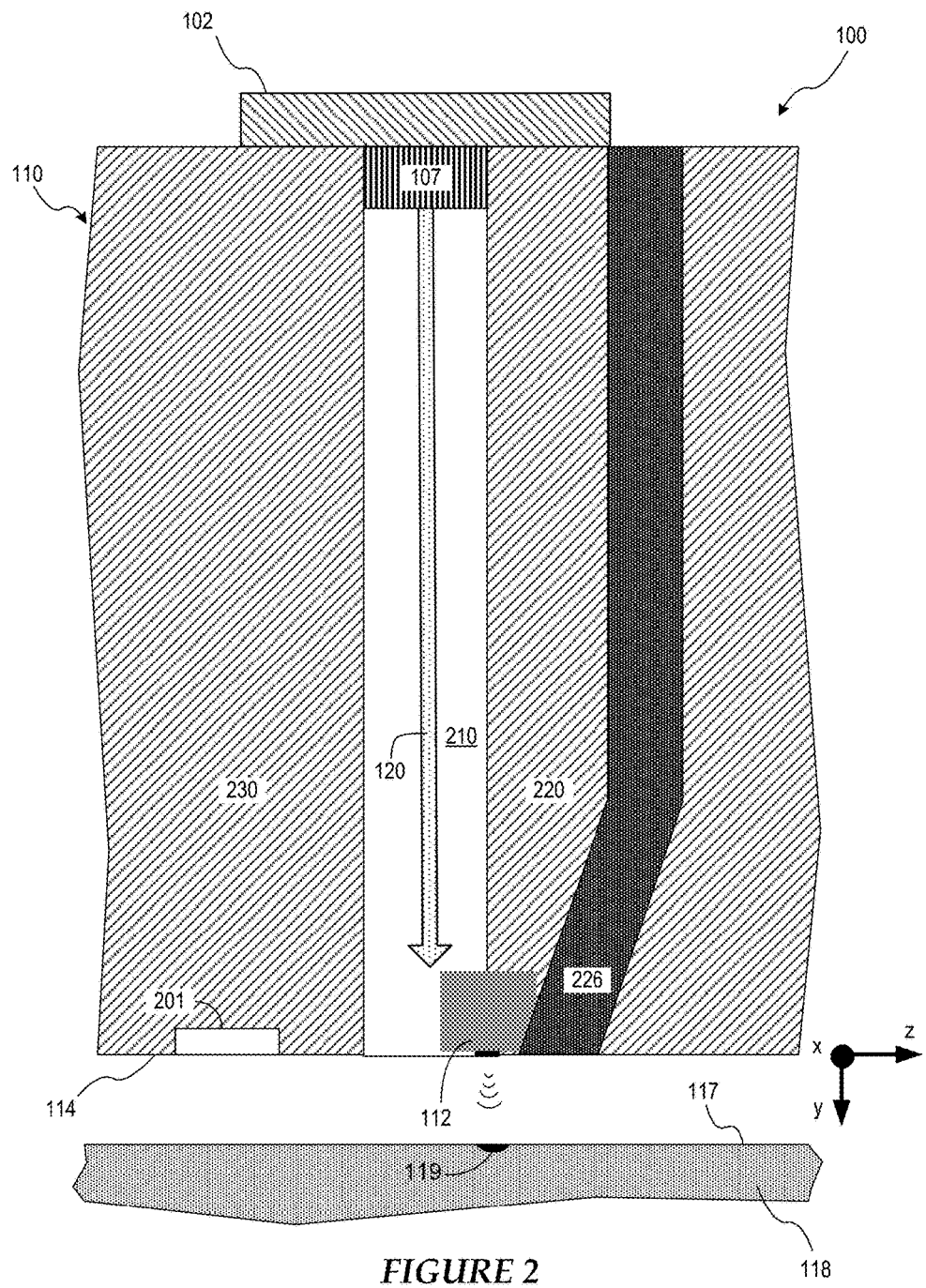
FIG. 2 is a cross-sectional view of a HAMR slider with which various embodiments disclosed herein may be implemented.

Embodiments of a HAMR head 100 that can incorporate a multi-purpose resistive sensor of the present disclosure are illustrated in FIGS. 1 and 2. As shown, the head 100 (also referred to as a slider) includes a light source (e.g., a laser diode) 102 located proximate a trailing edge surface 104 of the slider body 101. An optical wave (e.g., a laser beam) 120 generated by the light source 102 is delivered to an NFT 112 via an optical waveguide 110. The NFT 112 is aligned with a plane of an air bearing surface 114 of the head 100, and one edge of a read/write head 113 is on the ABS 114. The read/write head 113 includes at least one writer and at least one reader. In some embodiments, multiple writers (e.g., 2 writers) and multiple readers (e.g., 3 readers) can be incorporated into the read/write head 113. The ABS 114 faces, and is held proximate to, a surface 117 of a magnetic medium 118 during device operation. The ABS 114 is also referred to as a media-facing surface.

The light source 102 in this representative example may be an integral, edge firing device, although it will be appreciated that any source of electromagnetic energy may be used. For example, a surface emitting laser (SEL), instead of an edge firing laser, may be used as the source 102. A light source may also be mounted alternatively to other surfaces of the head 100, such as the trailing edge surface 104. While the representative embodiments of FIGS. 1 and 2 show the waveguide 110 integrated with the head 100, any type of light delivery configuration may be used. As shown in FIG. 1, the laser diode 102 is shown coupled to the slider body 101 via a submount 108. The submount 108 can be used to orient and affix an edge-emitting laser diode 102 so that its output is directed downwards (negative y-direction in the figure). An input surface of the slider body 101 may include a grating, and optical coupler or other coupling features to receive light from the laser diode 102.

When writing with a HAMR device, electromagnetic energy is concentrated onto a small hotspot 119 over the track of the magnetic medium 118 where writing takes place, as is shown in the embodiment of FIG. 2. The light from the light source 102 propagates to the NFT 112, e.g., either directly from the light source 102 or through a mode converter or by way of a focusing element. FIG. 2, for example, shows an optical coupler 107 adjacent the light source 102, which is configured to couple light produced from the light source 102 to the waveguide 110.

As a result of what is known as the diffraction limit, optical components cannot be used to focus light to a dimension that is less than about half the wavelength of the light. The lasers used in some HAMR designs produce light with wavelengths on the order of 700-1550 nm, yet the desired hot spot 119 is on the order of 50 nm or less. Thus, the desired hot spot size is well below half the wavelength of the light. Optical focusers cannot be used to obtain the desired hot spot size, being diffraction limited at this scale. As a result, the NFT 112 is employed to create a hotspot on the media.

The NFT 112 is a near-field optics device configured to generate local surface plasmon resonance at a designated (e.g., design) wavelength. The NFT 112 is generally formed from a thin film of plasmonic material on a substrate. In a HAMR head 100, the NFT 112 is positioned proximate the write pole 226 of the read/write head 113. The NFT 112 is aligned with the plane of the ABS 114 parallel to the surface 116 of the magnetic medium 118. The waveguide 110 and optional mode converter and/or other optical element directs electromagnetic energy 120 (e.g., laser light) onto the NFT 112. The NFT 112 achieves surface plasmon resonance in response to the incident electromagnetic energy 120. The plasmons generated by this resonance are emitted from the NFT 112 towards the magnetic medium 118 where they are absorbed to create a hotspot 119. At resonance, a high electric field surrounds the NFT 112 due to the collective oscillations of electrons at the metal surface (e.g., substrate) of the magnetic medium 118. At least a portion of the electric field surrounding the NFT 112 gets absorbed by the magnetic medium 118, thereby raising the temperature of a spot 119 on the medium 118 as data is being recorded.

The waveguide 110 shown in FIG. 2 includes a layer of core material 210 surrounded by first and second cladding layers 220 and 230. The first cladding layer 220, also referred to as a top cladding layer, is shown proximate the NFT 112 and the write pole 226. The second cladding layer 230, also referred to as a bottom cladding layer, is spaced away from the first cladding layer 220 and separated therefrom by the waveguide core 210. The core layer 210 and cladding layers 220 and 230 may be fabricated from dielectric materials, such as optical grade amorphous material with low thermal conductivities. The first and second cladding layers 220 and 230 may each be made of the same or a different material. The materials are selected so that the refractive index of the core layer 210 is higher than refractive indices of the cladding layers 220 and 230. This arrangement of materials facilitates efficient propagation of light through the waveguide core 210. Optical focusing elements (not shown) such as mirrors, lenses, etc., may be utilized to concentrate light onto the NFT 112. These and other components may be built on a common substrate using wafer manufacturing techniques known in the art. The waveguide 110 may be configured as a planar waveguide or channel waveguide.

As was previously discussed, laser light produced by the laser 220 is coupled to the NFT 210 via the waveguide 222. The NFT 210, in response to the incident laser light, generates a high power density in a near-field region that is directed to the magnetic storage medium 211. This high power density in a near-field region of the NFT 210 causes an increase in local temperature of the medium 211, thereby reducing the coercivity of the magnetic material for writing or erasing information to/at the local region of the medium 211. A portion of the laser light energy communicated to the NFT 210 is absorbed and converted to heat within the slider 215. This heating results in thermal expansion of the ABS materials, protrusion at the ABS 215, and a change in both head-media clearance and head-media separation. In addition to the NFT 210, the slider 202 typically includes additional heat sources that can cause further thermal expansion and protrusion of the ABS 215. Such additional heat sources, when active, include one or more of the writer 206 (writer coil), writer heater 207, and reader heater 204.

Figure 3:
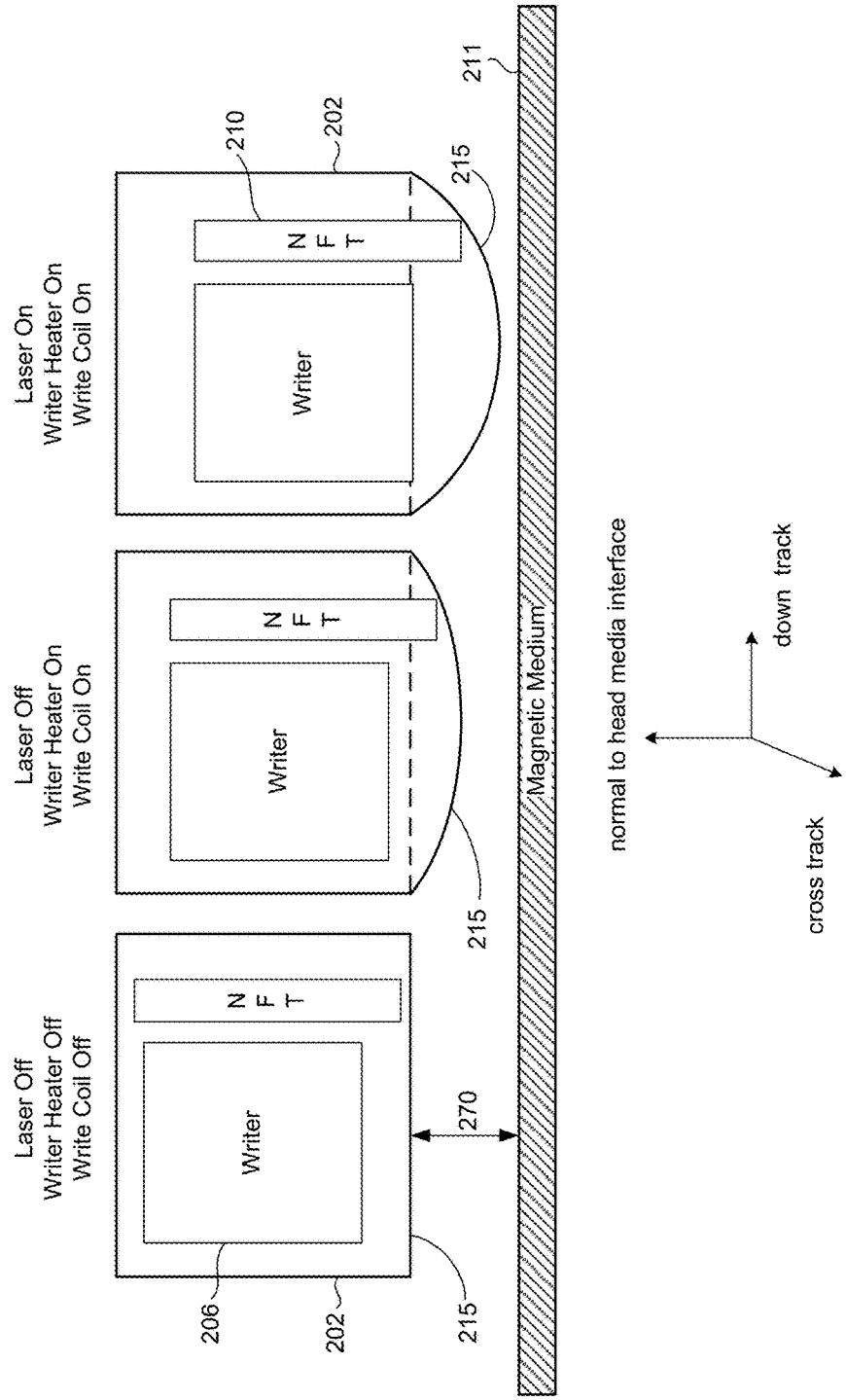
FIGS. 3A-3C are simplified side views of a writer portion of the HAMR slider illustrated in FIGS. 1 and 2.

FIGS. 3A-3C are simplified side views of a writer portion of the slider 202 illustrated in FIGS. 1 and 2. FIGS. 3A-3C show general protrusion progression of a portion of the slider ABS 215 in response to activation of different heat sources within the slider 202. These different heat sources include the write coil of the writer 206, the writer heater 207 (not shown for simplicity), and the laser 220 (not shown for simplicity) which produces the optical energy converted to heat by the NFT 210.

In FIG. 3A, the slider 202 is shown in a non-thermally actuated state. In this state, the laser 220, writer heater 207, and writer coil 206 are all off. Thus, the slider 202 attains a default, non-actuated shape/state establishing a default distance between the ABS 215 of the slider 202 and the surface of the magnetic storage medium 211. This default distance is illustrated by an air gap 270.

FIG. 3B illustrates the slider 202 in a partial-thermally actuated state, which is not a typical operational state but is shown for illustrative purposes. In this state, the writer heater 207 and the writer coil 206 are on, but the laser 220 is off. In response to activation of the writer heat sources (write pole, return pole) and writer heater 207, the ABS 215 at and surrounding the writer portion of the slider 202 protrudes into the air gap 270. Thus, the air gap 270 and the distance between ABS 215 and the medium surface 211 decreases. The dashed line in FIG. 3B indicates the default state/shape of ABS 215 depicted in FIG. 3A.

The magnitude of ABS protrusion of the slider 202 is furthered increased by the additional activation of the laser 220, as shown in FIG. 3C. The additional heat produced by the NFT 210 in response to the incident laser light further expands the ABS 215, causing the ABS 215 to protrude further into air gap 270. It can be seen in FIG. 3A-3C that the stroke, or magnitude, of the air bearing surface protrusion along the cross track direction (z-axis) of the slider 202 changes in size and shape with introduction and removal of heat to/from the ABS 215.

Figure 4:
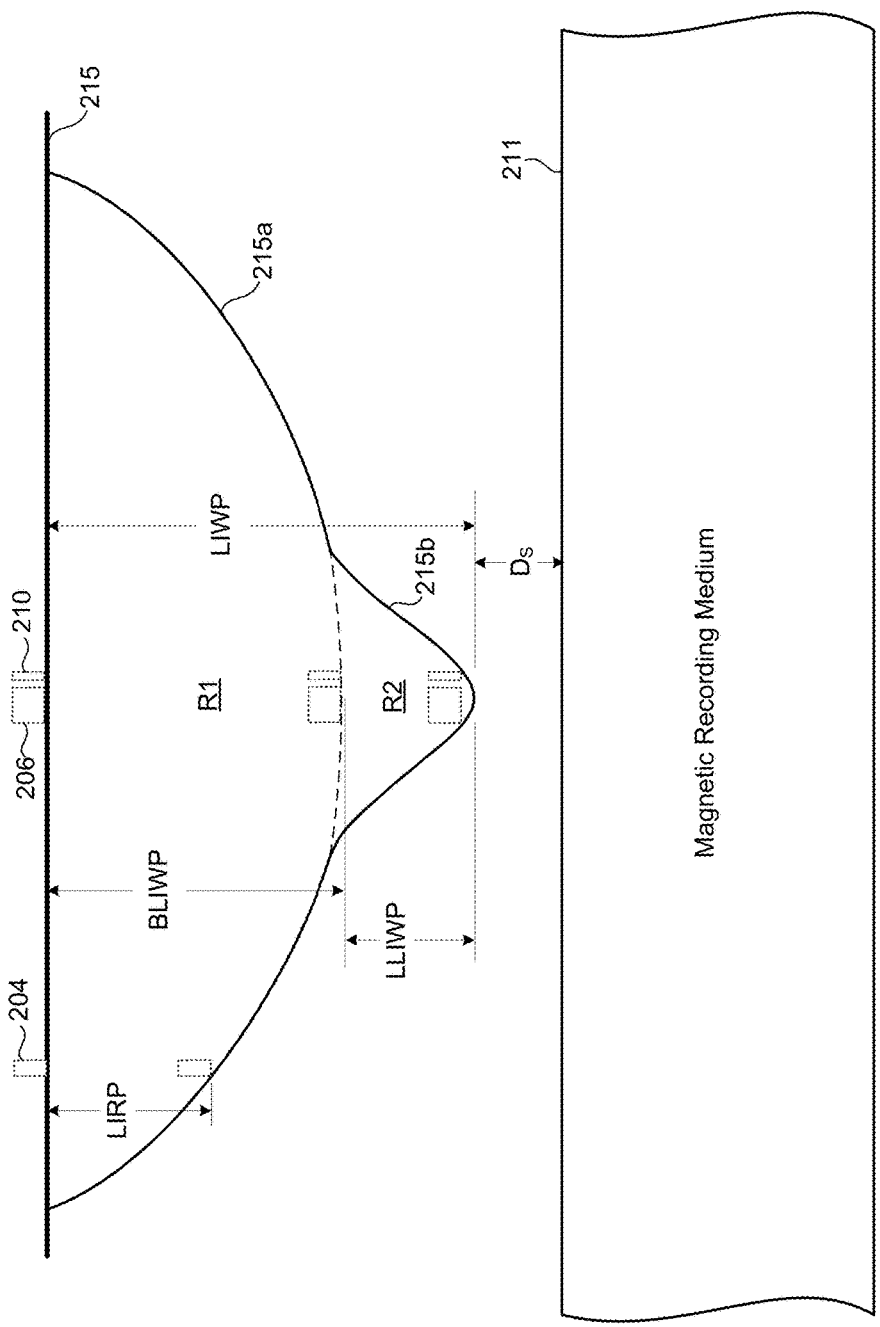
FIG. 4 is an exaggerated illustration of a laser-induced protrusion developed at the ABS of a HAMR slider in accordance with various embodiments.

FIG. 4 is an exaggerated illustration of a laser-induced protrusion developed at the ABS 215 of a HAMR slider 200 in accordance with various embodiments. More particularly, the protrusion of the slider ABS 215 shown in FIG. 4 is referred to herein as Laser-induced Writer Protrusion (LIWP). As a shown in FIG. 4, the region of LIWP encompasses a writer 206 and an NFT 210 of the slider. LIWP represents the full excursion of the protrusion developed at the ABS 215 due to heating of the NFT 210 by excitation of the laser and other heat sources (e.g., the writer 206 and writer heater 207). The reader 204 is also subject to displacement by the ABS protrusion resulting from excitation of the laser of the slider. Protrusion of the slider ABS 215 due to laser/NFT heating in the region that encompasses the reader 204 is referred to herein as Laser-induced Reader Protrusion (LIRP). Because the reader 204 is situated away from the NFT 210/writer 206, allowing for dissipation of laser-induced heat, LIRP is not as pronounced as LIWP. However, LIRP is quite noticeable and impacts reader performance. It is noted that the features shown in FIG. 4 are not drawn to scale.

LIWP is understood to include two protrusion components. The first component of LIWP is a broad protrusion component, referred to herein as Broad Laser-induced Writer Protrusion (BLIWP). As the term implies, a relatively broad region of the ABS 215 surrounding the writer 206 and NFT 210 expands to form a protruded region (volume) R1 in response to the heat generated by the NFT 210 and the writer 206 (and writer heater 207). The second component of LIWP is a local protrusion component, referred to herein as Local Laser-induced Writer Protrusion (LLIWP). LLIWP is a small and narrow protrusion (relative to the BLIWP) that extends from the BLIWP in a direction towards the surface of the magnetic recording medium 211. As can be seen in FIG. 4, the BLIWP component encompasses a significantly larger volume (in region R1) of ABS material relative to that (in region R2) of the LLIWP component. Evaluation of experimental sliders has revealed that LIWP typically ranges between about 2 and 4 nm, while LLIWP typically ranges between about 1 to 2 nm (<2 nm). It is understood that, although each of LIWP, BLIWP, LLIWP, and LIRP involves expansion of a volume of ABS material, these protrusion parameters are measured in terms of a distance (in nanometers) extending from the ABS 215 and along a plane normal to the ABS 215 in a direction towards the recording medium 211.

An important function of a hard disk drive (HDD) is to accurately set the clearance between the slider and the surface of the magnetic storage medium of the HDD in order to maintain the written bit size, and thus maintain areal bit density. Toward this end, various techniques have been developed to set clearance that involve incrementally reducing fly height of the slider until contact is made between the slider and the recording medium. Once contact is made, an appropriate clearance is set such that slider is made to fly close to, but spaced apart from, the surface of the medium during operation. It can be appreciated that for HAMR sliders, it is important to account for LIWP in order to avoid detrimental contact between the slider and the medium. Conventional clearance techniques use a sensor situated well away from the NFT 210/writer 206, thereby preventing localized sensing of operational write protrusion needed for highly accurate clearance, fly-height, and contact determinations.

Embodiments of the disclosure are directed to multi-purpose resistive sensor for use in an HAMR head or slider. According to various embodiments, a multi-purpose resistive sensor is configured to detect changes in output optical power of the laser source and contact between the slider and a magnetic recording medium. A resistive sensor of the present disclosure can be situated in close proximity to the NFT (e.g., the NFT/write pole close point), while negligibly impacting the optical and thermal performance of the NFT.

According to various embodiments, the resistive sensor comprises an ABS section situated at or proximate the ABS of the slider and a distal section that extends away from the ABS to a location at least lateral of or behind the NFT. The distal section of the resistive sensor is preferably exposed to light communicated from a laser source to the NFT via an optical waveguide. For example, at least a portion of the distal section of the resistive sensor can be situated within a cladding layer of the optical waveguide. The ABS section of the resistive sensor can be configured to serve as a contact/spacing sensor, and the distal section can be configured to serve as a bolometer sensor.

The multi-purpose resistive sensor can be configured to sense for one or more of head-medium contact, thermal asperities, and voids of a magnetic recording medium. The resistive sensor can be implemented as a thermal sensor, such as a resistive temperature sensor (e.g., TCR sensor). For example, the resistive sensor can be implemented as a DETCR (Differential Ended Thermal Coefficient of Resistance sensor).

The resistive sensor is situated at or near the ABS and proximate the NFT. The section of the resistive sensor proximate the NFT is preferably exposed to light transmitted along the light path of the slider. As such, the resistive sensor can serve as a bolometer sensor for the NFT (e.g., laser output power monitor), in addition to serving as a head-medium/asperity contact sensor. The bolometer section serves as an optical-to-thermal transducer configured to respond to fluctuations in output optical power of the laser. In some embodiments, the resistive sensor comprises a thin metallic wire extending along the ABS and into the body of the slider proximate the NFT. A small fraction of the output optical power of the laser transmitted via the light path of the slider is absorbed by the wire and converted into thermal power, thereby increasing wire temperature. Fluctuations in output optical power of the laser correlate to fluctuations in thermal power and temperature of the bolometer section of the resistive sensor. These fluctuations in temperature can be detected by circuitry configured of the HAMR device to monitor the resistance fluctuations in the wire by using a small bias current and a high thermal coefficient of resistance material.

The output of a laser diode used in a HAMR drive is temperature sensitive and susceptible to self-heating. During write operations, for example, laser diode heating can vary the junction temperature of the laser diode, causing a shift in laser emission wavelength, leading to a change of optical feedback from optical path in slider to the cavity of the laser diode, a phenomenon that is known to lead to mode hopping and/or power instability of the laser diode. Mode hopping is particularly problematic in the context of single-frequency lasers. Under some external influences, a single-frequency laser may operate on one resonator mode (e.g., produce energy with a first wavelength) for some time, but then suddenly switch to another mode (produce energy, often with different magnitude, with a second wavelength) performing "mode hopping." Temperature variation is known to cause mode hopping in laser diodes. Mode hopping is problematic for HAMR applications, as mode hopping leads to laser output power jumping and magnetic transition shifting from one block of data to another. Large transition shifts in a block of data may not be recoverable by channel decoding, resulting in error bits. The bolometer section of the resistive sensor can sense changes in output optical power of the laser indicative of a mode hop, as well as sensing temperature at or near the NFT.

Figure 5:
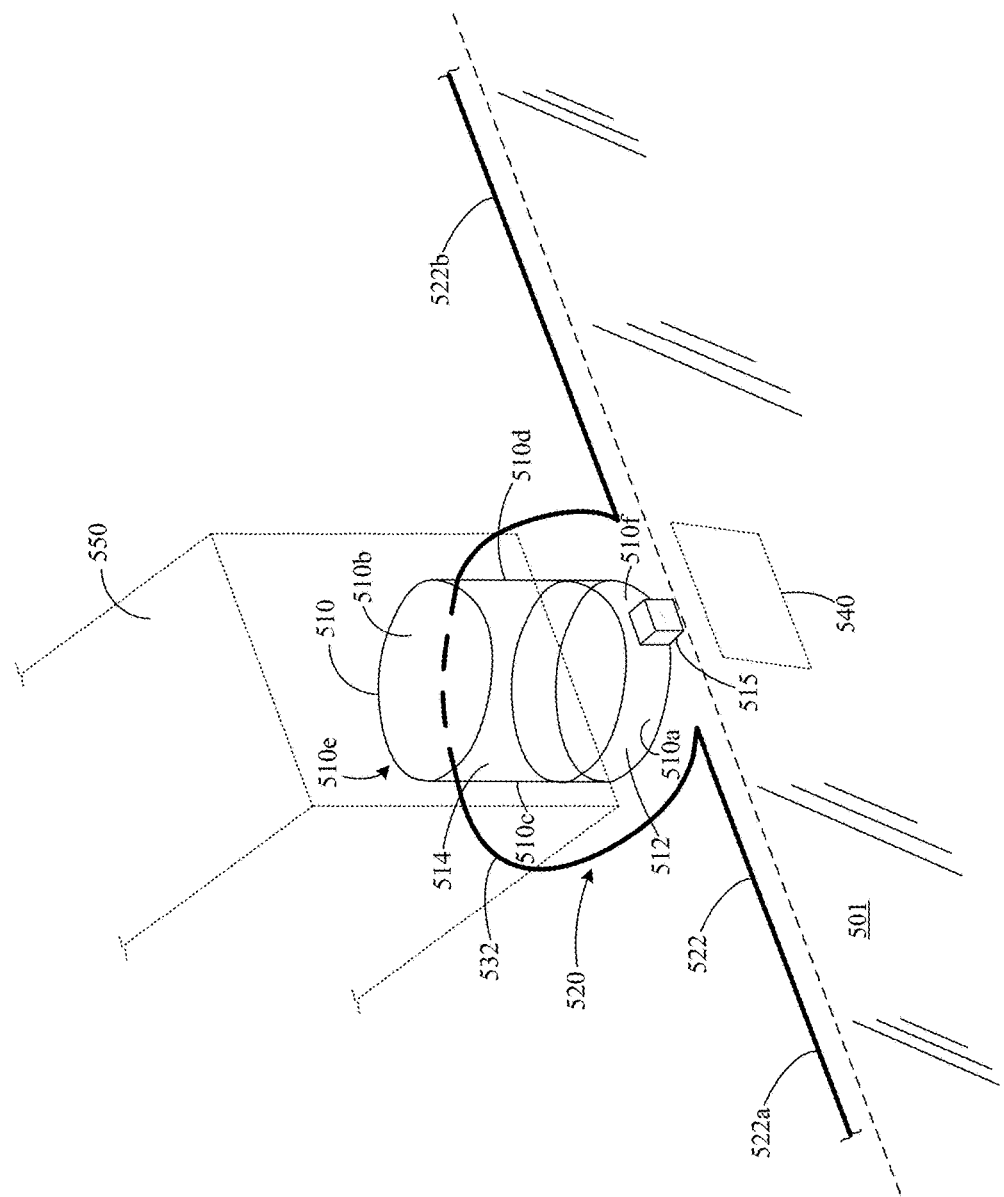
FIG. 5 illustrates a multi-purpose resistive sensor for use in a HAMR head in accordance with various embodiments.

FIG. 5 illustrates a multi-purpose resistive sensor for use in a HAMR head in accordance with various embodiments. FIG. 5 shows a multi-purpose resistive sensor 520 positioned at or near the ABS 501 of a HAMR slider and proximate an NFT 510. The NFT 510 is shown to include an NFT disc 512 from which a peg 515 extends in a direction toward the ABS 501. The NFT 510 also includes an enlarged region 514 that serves as a heatsink. The heatsink 514 of the NFT 510 is in contact with the write pole tip 550 (shown in dotted lines) of a writer. The location of the terminal end of the waveguide core 540 is shown projected at the ABS 501.

The resistive sensor 520 comprises an ABS section 522 and a distal section 532. In the embodiment shown in FIG. 5, the ABS section 522 includes a first ABS section 522a and a second ABS section 522b. The first ABS section 522a is spaced apart from the second ABS section 522b in a cross-track direction. The distal section 532 of the resistive sensor 520 extends into the body of the slider away from the ABS 501 to a location lateral of and behind the NFT 510. In some embodiments, the ABS section 522 and the distal section 532 of the resistive sensor 520 are situated in a plane substantially perpendicular to a plane of the ABS 501. The plane of the ABS section 522 and the distal section 532 can reside at a location proximate or between the first and second end surfaces 510a and 510b of the NFT 510. In other embodiments, the distal section 532 can extend into the body of the slider along a plane oriented at an oblique angle relative to the plane of the ABS 501.

In the embodiment shown in FIG. 5, the distal section 532 of the resistive sensor 520 at least partially surrounds the NFT 510. The distal section 532 extends between the first and second ABS sections 522a and 522b, and encompasses locations lateral of and behind the NFT 510. More particularly, the NFT 510 includes a first lateral surface 510c, a non-media facing surface 510e opposing a media-facing surface 501f, and a second lateral surface 510d. The first ABS section 522a extends along a portion of the ABS 501 to a location proximate the first lateral surface 510c. The second ABS section 522b extends along a portion of the ABS 501 to a location proximate the second lateral surface 510d. The distal section 532 is connected to the first and second ABS sections 522a and 522b, and surrounds the first lateral surface 510c, the non-media facing surface 510e, and the second lateral surface 510d of the NFT 510. In the configuration shown in FIG. 5, the resistive sensor 520 has a shape generally resembling the Greek symbol Omega.

Figure 6:
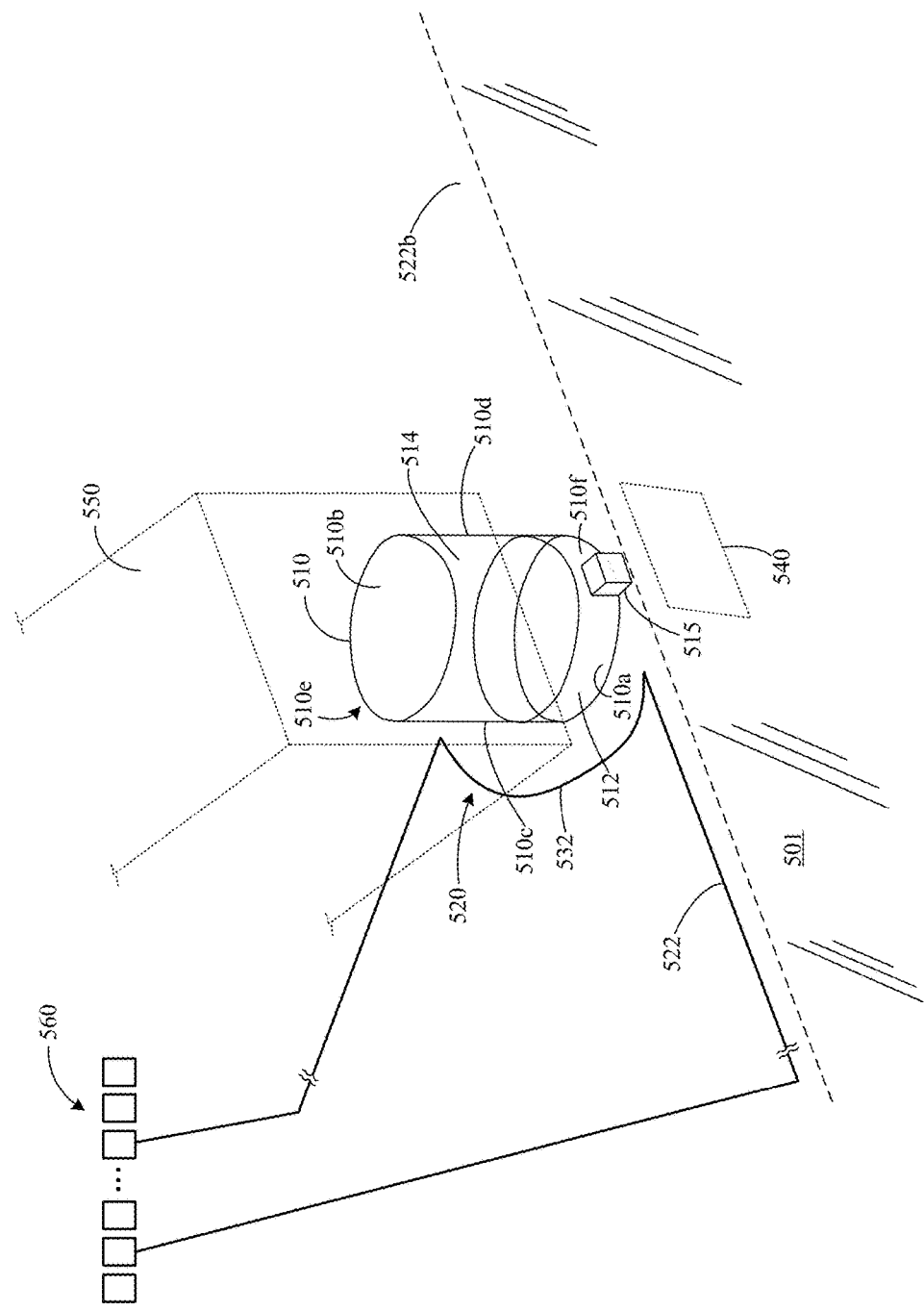
FIG. 6 illustrates a multi-purpose resistive sensor for use in a HAMR head in accordance with other embodiments.

FIG. 6 illustrates a multi-purpose resistive sensor for use in a HAMR head in accordance with other embodiments. The resistive sensor 520 shown in FIG. 6 comprises an ABS section 522 and a distal section 532. In the embodiment shown in FIG. 6, the ABS section 522 extends along the ABS 501 and approaches the NFT 510 from one of the lateral sides of the NFT 510. As shown, the ABS section 522 approaches the first lateral side 510c of the NFT 510. It is understood that the ABS section 522 can alternatively approach the second lateral side 510d in other embodiments. The distal section 532 of the resistive sensor 520 extends into the body of the slider away from the ABS 501 to a location proximate the first lateral surface 510c of the NFT 510. The distal section 532 may extend along a portion or the entirety of the first lateral side 510c of the NFT 510. In some embodiments, the distal section 532 may extend along the first lateral side 510c and at least a portion of the non-media facing surface 510e of the NFT 510. In FIG. 6, the ABS section 522 of the resistive sensor 520 does not extend to the second lateral surface 510d of the NFT 510.

In some embodiments, the ABS section 522 and the distal section 532 of the resistive sensor 520 are situated in a plane substantially perpendicular to a plane of the ABS 501. The plane of the ABS section 522 and the distal section 532 can reside at a location proximate or between the first and second end surfaces 510a and 510b of the NFT 510. In other embodiments, the distal section 532 can extend into the body of the slider along a plane oriented at an oblique angle relative to the plane of the ABS 501.

The multi-purpose resistive sensor 520 shown in FIGS. 5 and 6 (and other figures) provides multiple functions (e.g., laser power monitoring, head-medium spacing detection, contact detection) while requiring connection to only two electrical bond pads of the slider. As shown in FIG. 6, for example, the slider can include a number of electrical bond pads 560 (e.g., 9 or 10 bond pads), which can be coupled to the voltage sources, current sources, control signal lines, and electrical ground, for example. The resistive sensor 520 can be connected to a pair of electrical bond pads, which eliminates the need for additional bond pads otherwise required for connecting separate contact and bolometric sensors using a conventional approach.

Figure 7:
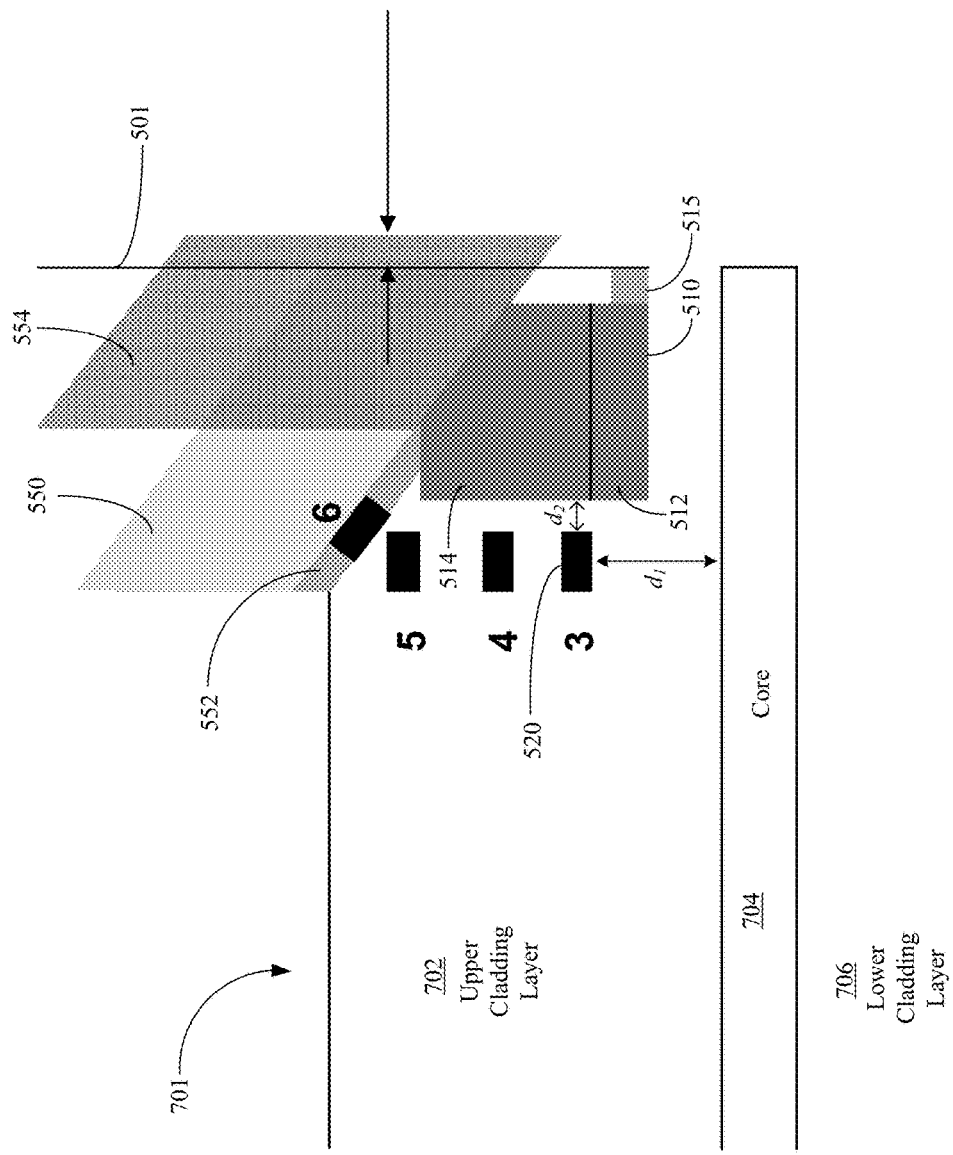
FIG. 7 shows a resistive sensor that can be situated at different locations behind the NFT of a HAMR slider in accordance with various embodiments.

FIG. 7 illustrates a multi-purpose resistive sensor of the present disclosure which can be situated at a number of different locations relative to the NFT of a HAMR slider in accordance with various embodiments. FIG. 7 is a cross-sectional view that shows a portion of a HAMR slider which includes an NFT 510, a write pole 550 of a writer, and a heat sink 554 positioned relative to an ABS 501 of the slider. The NFT 510 includes an NFT disc 512 from which a peg 515 extends, and a heat sink 514 which contacts a portion of the write pole 550. A diffuser 552 is shown disposed on a surface of the write pole 550 proximate the NFT 510. The diffuser 552 contacts a surface of the NFT's heat sink 514, and serves as a heat channel for conducting heat away from the NFT 514 and the write pole tip 550. The spacing between the two opposing arrows at the ABS 501 indicates the extent of write pole recession relative to the heat sink 554.

FIG. 7 also shows portions of an optical waveguide 701 of the HAMR slider that communicates light from a laser to the NFT 510. The optical waveguide 701 includes an upper cladding layer 702, a lower cladding layer 706, and a core 704 disposed between the upper and lower cladding layers 702 and 706. The multi-purpose resistive sensor 520 is shown at different locations relative to the NFT 510, designated by different sensor locations. These different sensor locations are shown as locations 3, 4, 5, and 6. Irrespective of the locations shown in FIG. 7, the resistive sensor 520 is situated within the upper cladding layer 702, but spaced apart from the core 704. A rendering of the resistive sensor 520 at each of the sensor locations shown in FIG. 7 is provided in FIGS. 10, 11, 12, and 13, respectively.

Modeling was performed to evaluate various performance characteristics of the resistive sensor 520 at each of the locations shown in FIG. 7. Data of these performance characteristics are provided in FIGS. 15-21. Results from the optical and thermal modeling demonstrate that the resistive sensor 520 can be placed behind the NFT 510 (e.g., the NFT's heat sink 514) without significantly affecting performance or temperature of the NFT 510 and write pole 550 as long as a minimum spacing, $d_1$, between the resistive sensor 520 and the core 704 exists. It was found, for example, that the resistive sensor 520 should be situated at least 350 nm above the top surface of the core 704 (e.g., $d_1 > \sim 350$ nm). Placing the resistive sensor 520 behind the NFT 510 at a location at least 350 nm above the top surface of the core 704 allows for a more accurate NFT/WP clearance setting, usage of the resistive sensor 520 as a bolometer, and usage of the resistive sensor 520 as an NFT temperature sensor. It was also found that the resistive sensor 520 can be placed close to the NFT 510 without having a significant adverse effect on the NFT's performance. It was found, for example, that the spacing, $d_2$, between the resistive sensor 520 and the NFT 510 (e.g., the non-media facing surface) should be at least about 50 nm.

Figure 8:
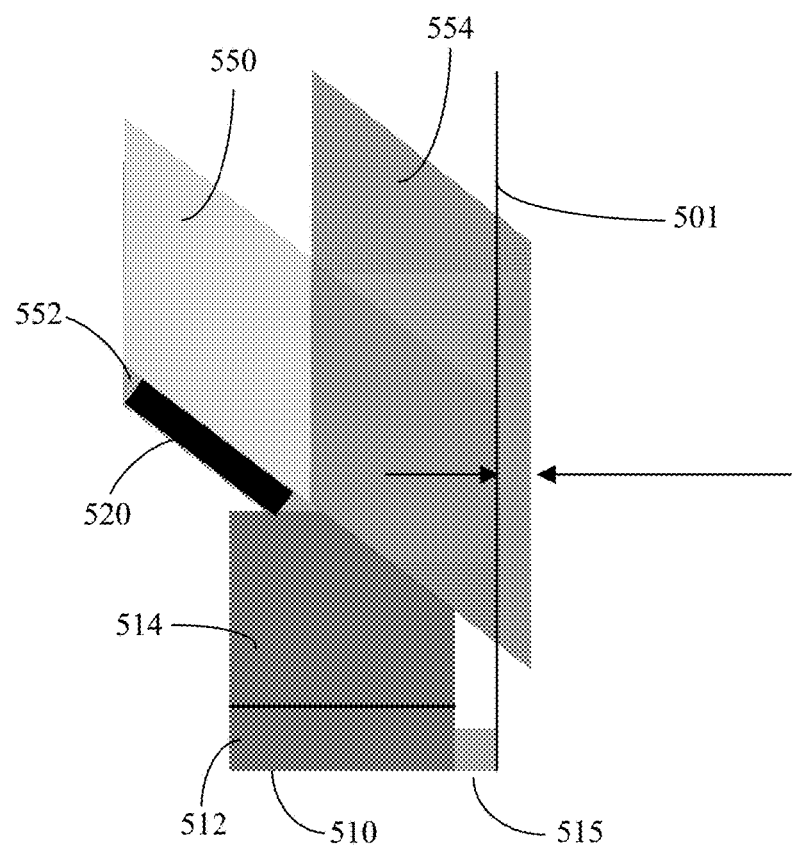
FIG. 8 shows a resistive sensor located behind and above the NFT of a HAMR slider in accordance with various embodiments.
Figure 10:
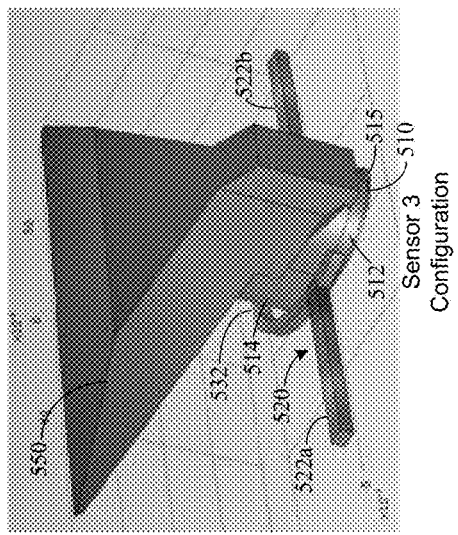
FIG. 10 illustrates a resistive sensor at location 3 shown in FIG. 7 in accordance with various embodiments.

In FIG. 7, the resistive sensor 520 at location 3 is positioned near the top of the NFT disc 512 and the bottom of the NFT's heat sink 514 (see FIG. 10). At location 4, the resistive sensor 520 is near a midpoint of the NFT's heat sink 514 (see FIG. 11). At location 5, the resistive sensor 520 is at or above the top of the NFT's heat sink 514 but below the diffuser 552 of the write pole 550 (see FIG. 12). At location 6, the resistive sensor 520 is above the top of the NFT's heat sink 514 and in contact with diffuser 552 of the write pole 550 (see FIG. 13). FIG. 8 shows a resistive sensor 520 at location 6 in accordance with some embodiments. In particular, FIG. 8 shows the resistive sensor 520 above and mostly behind the NFT 510 and in contact with the write pole 550 (e.g., the diffuser 552).

As was discussed above, optical and thermal modeling was performed to evaluate various performance characteristics of the resistive sensor 520 at various locations of the HAMR slider shown in FIG. 7. The modeling effort evaluated six different NFT/write pole/resistive sensor configurations, which are shown in FIGS. 9-14. It is noted that structural elements of the NFT 510, write pole 550, and resistive sensor 520 shown in FIG. 7 are indicated with like reference numbers in FIGS. 9-14.

Figure 12:
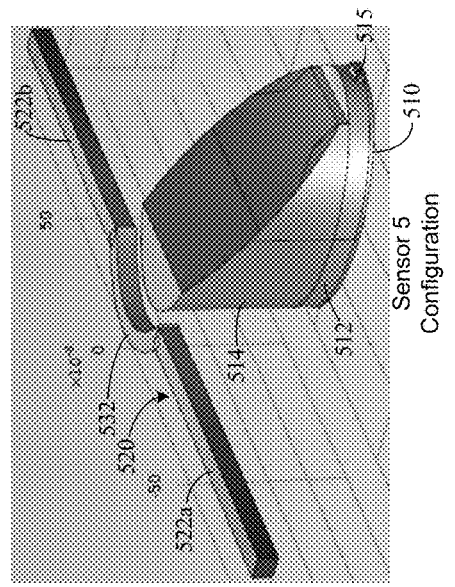
FIG. 12 illustrates a resistive sensor at location 5 shown in FIG. 7 in accordance with various embodiments.
Figure 9:
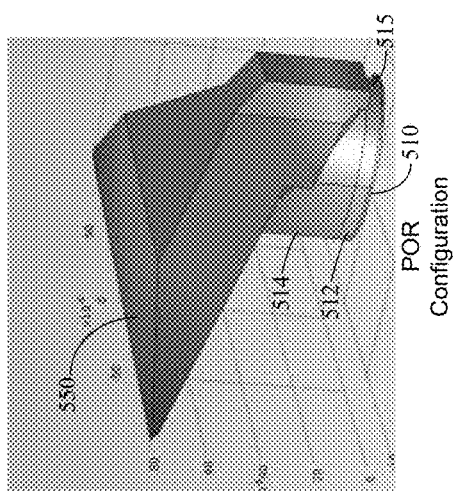
FIG. 9 shows a plan of record (POR) slider configuration which includes an NFT and a write pole, but does not include a resistive sensor.
Figure 11:
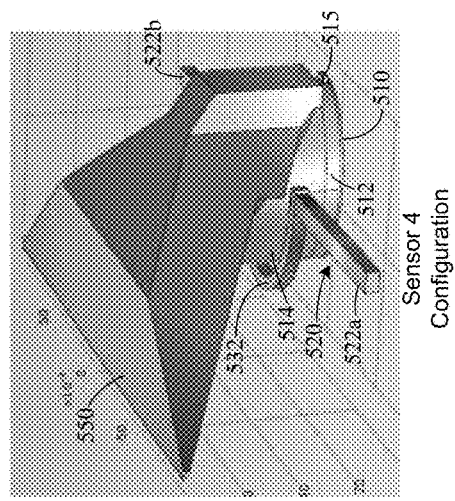
FIG. 11 illustrates a resistive sensor at location 4 shown in FIG. 7 in accordance with various embodiments.
Figure 13:
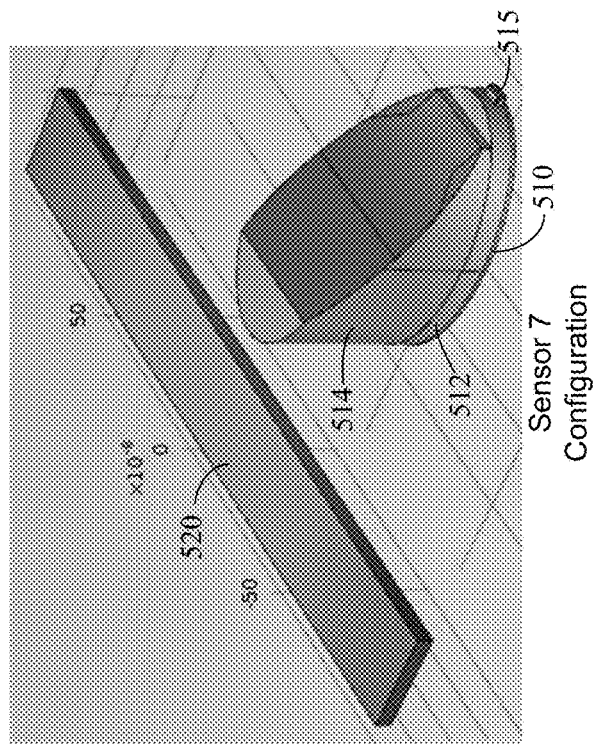
FIG. 13 illustrates a resistive sensor at location 6 shown in FIG. 7 in accordance with various embodiments.
Figure 14:
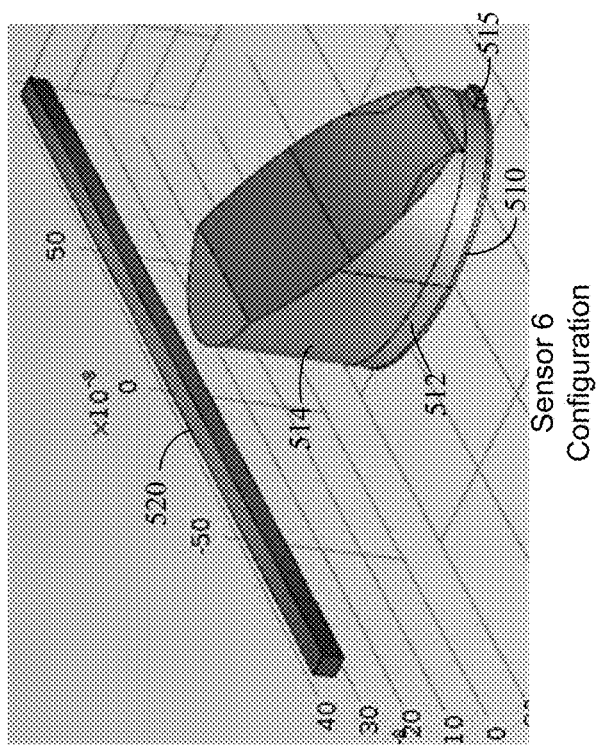
FIG. 14 illustrates a resistive sensor also situated at location 6 shown in FIG. 7 in accordance with various embodiments.

FIG. 9 shows a plan of record (POR) configuration, which includes the NFT 510 and the write pole 550. The POR configuration shown in FIG. 9 does not include a resistive sensor 520. FIG. 10 illustrates a resistive sensor 520 at location 3 shown in FIG. 7. The resistive sensor 520 situated at location 3 is referred to herein as the Sensor 3 configuration. FIG. 11 illustrates a resistive sensor 520 at location 4 shown in FIG. 7. The resistive sensor 520 situated at location 4 is referred to herein as the Sensor 4 configuration. FIG. 12 illustrates a resistive sensor 520 at location 5 shown in FIG. 7. The resistive sensor 520 situated at location 5 is referred to herein as the Sensor 5 configuration. FIG. 13 illustrates a resistive sensor 520 at location 6 shown in FIG. 7. The resistive sensor 520 situated at location 6 is referred to herein as the Sensor 6 configuration. FIG. 14 illustrates a resistive sensor 520 also situated at location 6 shown in FIG. 7. The resistive sensor 520 shown in FIG. 14 is wider than that shown in FIG. 13, and is referred to herein as the Sensor 7 configuration.

FIGS. 15-21 show various performance data associated with each of the sensor configurations shown in FIGS. 9-14. In general, it is desirable that configurations incorporating a resistive sensor 520 provide performance characteristics similar to those of the plan of record (POR) configuration shown in FIG. 9. For example, a configuration that incorporates a resistive sensor 520 and provides performance characteristics similar to the POR configuration shown in FIG. 9 will have about the same optical and thermal performance as the POR configuration.

Figure 15:
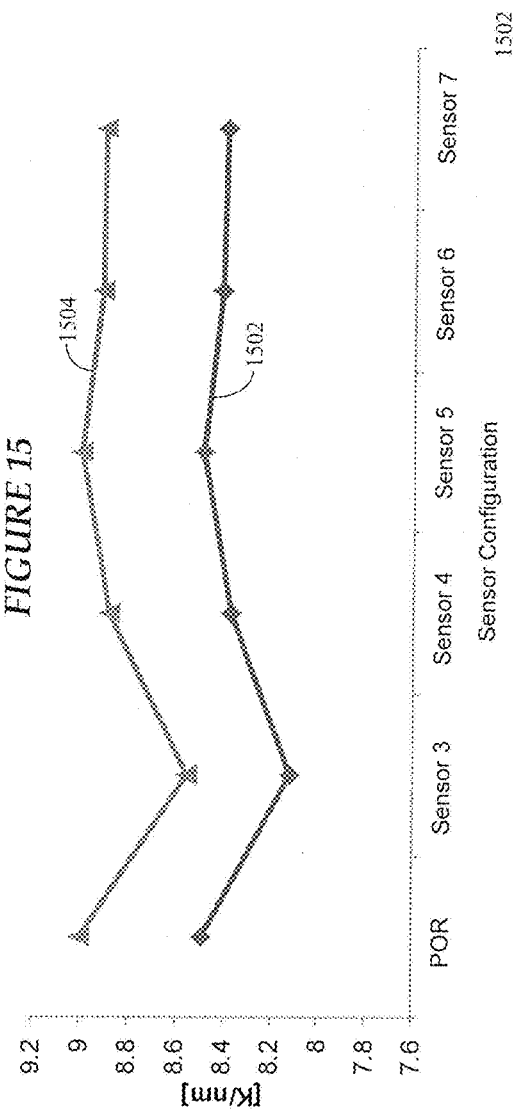
FIG. 15 is a graph showing cross-track and down-track thermal gradients for each of the six configurations shown in FIGS. 9-14.

FIG. 15 is a graph showing cross-track and down-track thermal gradients (in K/nm) for each of the six configurations shown in FIGS. 9-14. The data supporting the curves 1504 and 1502 of FIG. 15 are provided in Table 1 below.

TABLE 1

| Sensor | wTG_DT (K/nm) | wTG_CT (K/nm) |
|---|---|---|
| POR | 8.49 | 9.00 |
| Sensor 3 | 8.12 | 8.56 |
| Sensor 4 | 8.37 | 8.88 |
| Sensor 5 | 8.49 | 9.00 |
| Sensor 6 | 8.41 | 8.92 |
| Sensor 7 | 8.40 | 8.91 |

Curve 1502 shows the down-track thermal gradient (wTG_DT) for each of the six configurations. Curve 1504 shows the cross-track thermal gradient (wTG_CT) for each of the six configurations. The Sensor configuration 3 shows the greatest deviation in thermal gradient from that of the POR configuration. The thermal gradient data for Sensor configurations 4-7 are somewhat similar to that of the POR configuration. It is noted that the Sensor 3 configuration places the resistive sensor 520 closest to the core 704 of the optical waveguide of the slider (e.g., <350 nm). The Sensor configurations 4-7 place the resistive sensor 520 further than 350 nm from the core 704 of the optical waveguide.

Figure 16:
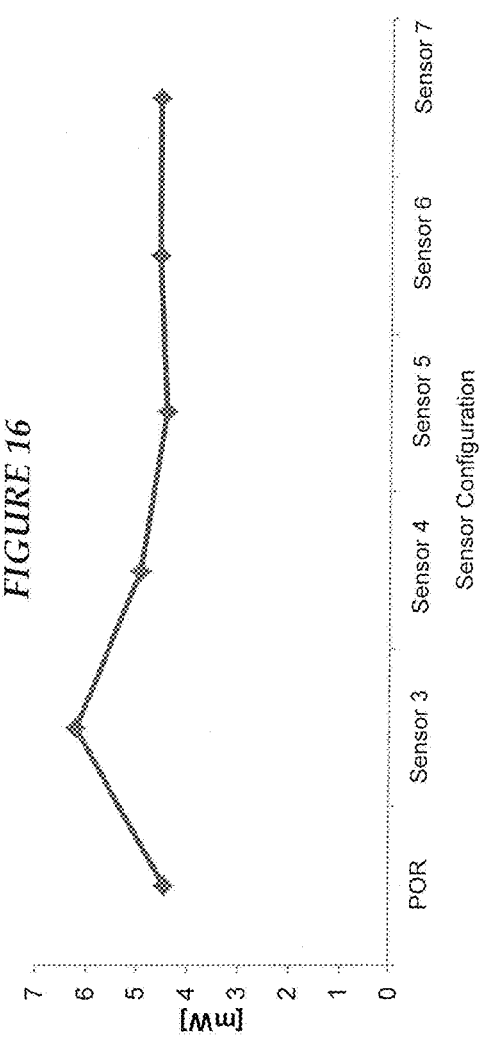
FIG. 16 shows the power required to write data to a HAMR medium for each of the six configurations shown in FIGS. 9-14.

FIG. 16 shows the power required to write data to a HAMR medium (in mW) for each of the six slider configurations (as measured from the laser diode to the NFT). The data supporting the curve shown in FIG. 16 are provided in Table 2 below.

TABLE 2

| Sensor | Pwr_Req (mW) |
|---|---|
| POR | 4.47 |
| Sensor 3 | 6.25 |
| Sensor 4 | 4.96 |
| Sensor 5 | 4.46 |
| Sensor 6 | 4.60 |
| Sensor 7 | 4.60 |

The Sensor 3 configuration shows the greatest deviation in power requirement from that of the POR configuration. The power requirement data for the Sensor 4 configuration is significantly better than that of the Sensor 3 configuration, but worse than that of the Sensor configurations 5-7. The power requirement data for the Sensor configurations 5-7 are somewhat similar to that of the POR configuration. As is noted above, the Sensor 3 configuration places the resistive sensor 520 closest to the core 704 (e.g., <350 nm), while the Sensor configurations 4-7 place the resistive sensor 520 further than 350 nm from the core 704.

Figure 17:
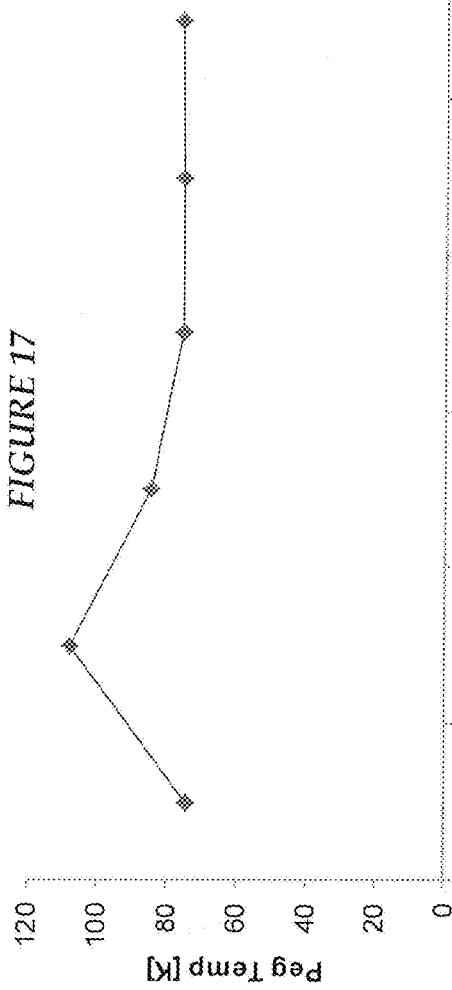
FIG. 17 shows the temperature of the NFT peg for each of the six configurations shown in FIGS. 9-14.
Figure 18:
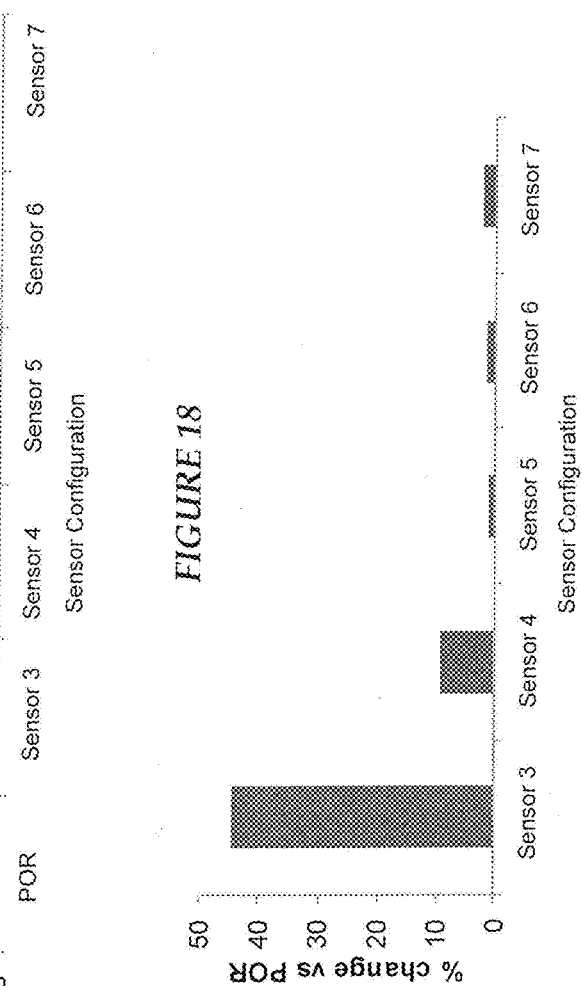
FIG. 18 shows the percentage change in peg temperature for each of the five configurations shown in FIGS. 10-14 relative to the POR configuration shown in FIG. 9.

FIG. 17 shows the temperature of the NFT peg (in K) for each of the six configurations. FIG. 18 shows the percentage change in peg temperature for each of the five configurations that incorporate a resistive sensor relative to the POR configuration. The peg temperature data shown in FIGS. 17 and 18 follows the thermal gradient and power requirement data. More particularly, the Sensor 3 configuration produced the highest peg temperature relative to the POR configuration. The Sensor 4-7 configurations produced a peg temperature similar to that of the POR configuration.

Figure 19:
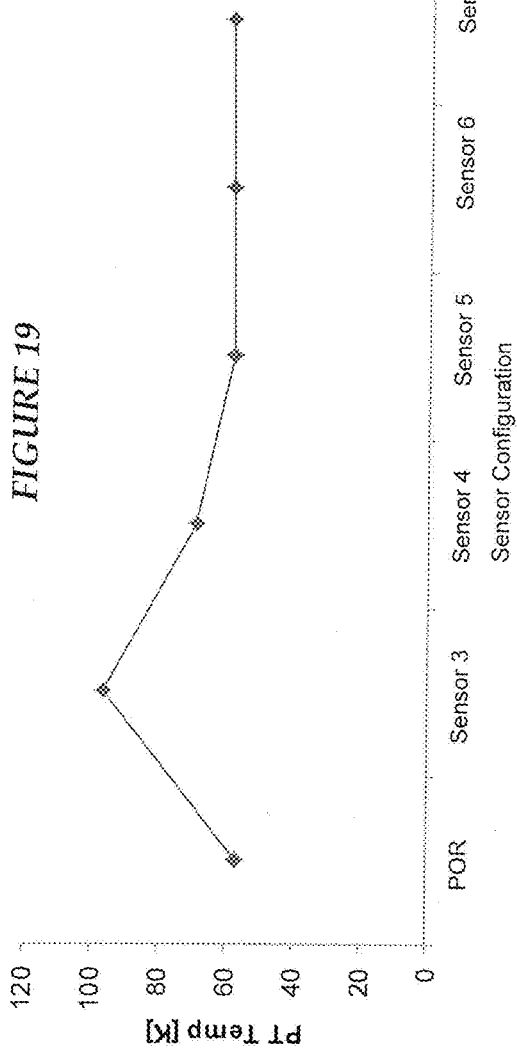
FIG. 19 shows temperature of the write pole tip due to interaction with the light for each of the six configurations shown in FIGS. 9-14.
Figure 20:
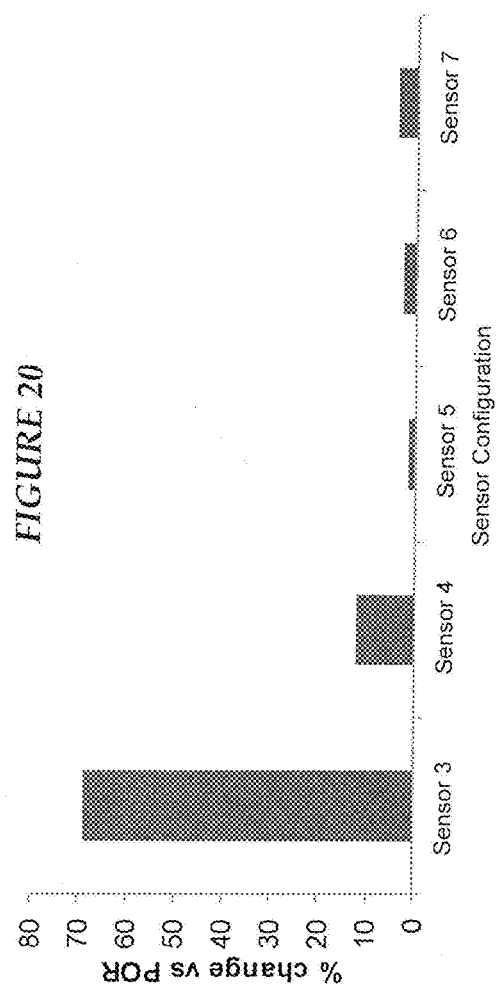
FIG. 20 shows the percentage change in pole tip temperature for each of the five configurations shown in FIGS. 10-14 relative to the POR configuration shown in FIG. 9.

FIG. 19 shows temperature of the write pole tip (PT) due to interaction with the light for each of the six configurations. FIG. 20 shows the percentage change in pole tip temperature for each of the five configurations that incorporate a resistive sensor relative to the POR configuration. The pole tip temperature data shown in FIGS. 19 and 20 follows the thermal gradient, power requirement, and peg temperature data discussed previously. More particularly, the Sensor 3 configuration produced the highest pole tip temperature relative to the POR configuration. The Sensor 4-7 configurations produced a pole tip temperature similar to that of the POR configuration.

Figure 21:
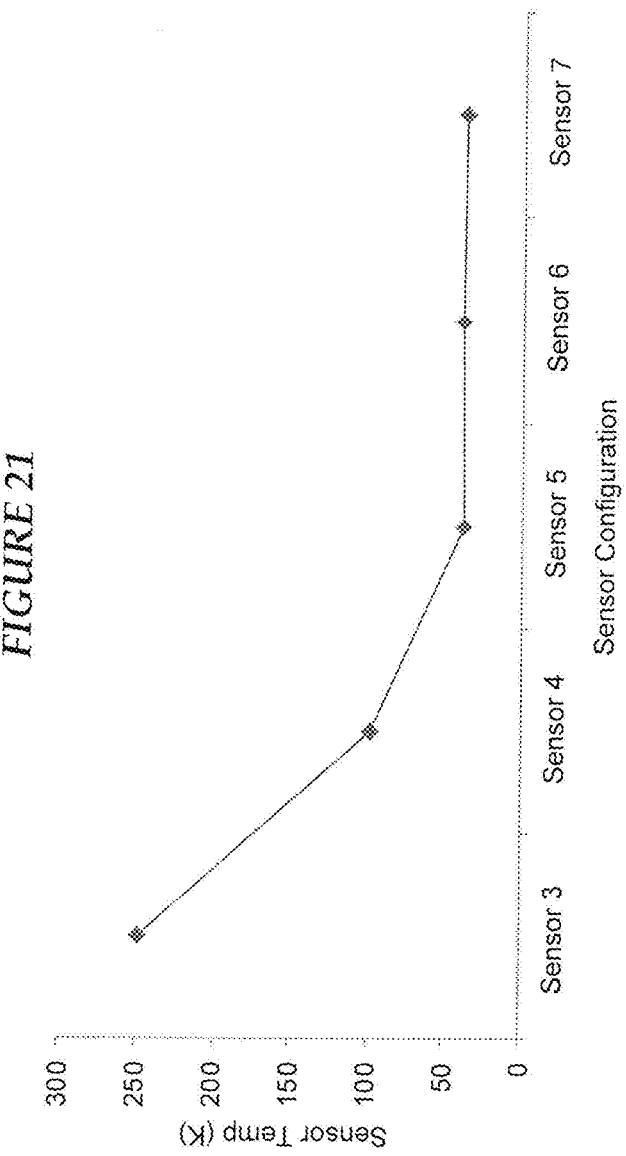
FIG. 21 shows the temperature of the resistive sensor due to interaction with the light for each of the five configurations shown in FIGS. 10-14.

FIG. 21 shows temperature of the resistive sensor due to interaction with the light for each of the five configurations that include a resistive sensor 520. As can be seen in FIG. 21, the Sensor 3 configuration produced a significantly higher resistive sensor temperature than that of the Sensor 4-7 configurations. More particularly, the Sensor 3 configuration resulted in more than a twofold increase in resistive sensor temperature relative to the Sensor 4 configuration, and more than a four-fold increase in resistive sensor temperature relative to the Sensor 5-7 configurations. As is noted above, the Sensor 3 configuration places the resistive sensor 520 closest to the core 704 (e.g., <350 nm), while the Sensor configurations 4-7 place the resistive sensor 520 further than 350 nm from the core 704.

The data reflected in the graphs of FIGS. 15-21 demonstrate that the resistive sensor 520 can be placed behind the NFT 510 without significantly affecting performance or temperature of the NFT 510 and write pole 550 as long as a minimum spacing (e.g., 350 nm) between the resistive sensor 520 and the core 704 of the optical waveguide exists. As was discussed previously, situating the resistive sensor 520 behind the NFT 510 at a location at least 350 nm above the top surface of the core 704 allows for a more accurate NFT/WP clearance setting, usage of the resistive sensor 520 as a bolometer, and usage of the resistive sensor 520 as an NFT temperature sensor.

Systems, devices or methods disclosed herein may include one or more of the features structures, methods, or combination thereof described herein. For example, a device or method may be implemented to include one or more of the features and/or processes above. It is intended that such device or method need not include all of the features and/or processes described herein, but may be implemented to include selected features and/or processes that provide useful structures and/or functionality. Various modifications and additions can be made to the disclosed embodiments discussed above. Accordingly, the scope of the present disclosure should not be limited by the particular embodiments described above, but should be defined only by the claims set forth below and equivalents thereof.

What is claimed is:

1. An apparatus, comprising:
a slider comprising an air bearing surface (ABS);
a near-field transducer (NFT) at or near the ABS;
an optical waveguide configured to couple light from a laser source to the NFT; and
a resistive sensor comprising an ABS section situated at or proximate the ABS and a distal section extending away from the ABS to a location at least lateral of or behind the NFT, the resistive sensor configured to detect changes in output optical power of the laser source and contact between the slider and a magnetic recording medium.

2. The apparatus of claim 1, wherein the ABS section of the resistive sensor extends along the ABS in a cross-track direction.

3. The apparatus of claim 1, wherein the distal section of the resistive sensor extends from a location at or proximate the ABS and into a body of the slider to the location lateral of the NFT.

4. The apparatus of claim 1, wherein the distal section of the resistive sensor extends from a location at or proximate the ABS and into a body of the slider to the location behind of the NFT.

5. The apparatus of claim 1, wherein the distal section of the resistive sensor extends from a location at or proximate the ABS and into a body of the slider, and at least partially surrounds the NFT.

6. The apparatus of claim 1, wherein:
the ABS section comprises a first ABS section and a second ABS section spaced apart from the first ABS section in a cross-track direction; and
the distal section at least partially surrounds the NFT and is connected to the first and second ABS sections.

7. The apparatus of claim 1, wherein:
the NFT comprises a non-media facing surface opposing the ABS, a first lateral surface, and a second lateral surface opposing the first lateral surface; and
the distal section of the resistive sensor extends from the ABS into a body of the slider and surrounds the first lateral surface, the second lateral surface, and the non-media facing surface of the NFT.

8. The apparatus of claim 1, wherein:
the NFT comprises a non-media facing surface opposing the ABS, a first lateral surface, and a second lateral surface opposing the first lateral surface;
the ABS section comprises a first ABS section proximate the first lateral surface of the NFT and a second ABS section proximate the second lateral surface of the NFT; and
the distal section of the resistive sensor is connected to the first and second ABS sections and surrounds the first lateral surface, the second lateral surface, and the non-media facing surface of the NFT.

9. The apparatus of claim 1, wherein at least the distal section of the resistive sensor is situated to receive at least some of the light coupled to the optical waveguide.

10. The apparatus of claim 1, wherein:
the optical waveguide comprises a first cladding layer, a second cladding layer, and a core disposed between the first and second cladding layers; and
at least a portion of the distal section of the resistive sensor is disposed within one of the first and second cladding layers.

11. The apparatus of claim 10, wherein the resistive sensor is spaced apart from the core by a distance of at least about 350 nm.

12. The apparatus of claim 1, wherein the resistive sensor is spaced apart from the NFT by a distance of at least about 50 nm.

13. The apparatus of claim 1, wherein the resistive sensor comprises a metal wire having a thermal coefficient of resistance.

14. An apparatus, comprising:
a slider comprising an air bearing surface (ABS);
a write pole comprising a write pole tip at the ABS;
a near-field transducer (NFT) at or near the ABS adjacent the write pole;
an optical waveguide configured to couple light from a laser source to the NFT;
a resistive sensor comprising an ABS section and a distal section;
the ABS section comprising a first ABS section spaced apart from a second ABS section in a cross-track direction, the NFT situated between the first and second ABS sections; and
the distal section at least partially surrounding the NFT and connected to the first and second ABS sections.

15. The apparatus of claim 14, wherein the first and second ABS sections extend along the ABS in a cross-track direction.

16. The apparatus of claim 14, wherein the resistive sensor is orientated along a plane substantially perpendicular to a plane of the ABS.

17. The apparatus of claim 14, wherein:
the NFT comprises a non-media facing surface opposing the ABS, a first lateral surface, and a second lateral surface opposing the first lateral surface;
the first ABS section is proximate the first lateral surface of the NFT;
the second ABS section is proximate the second lateral surface of the NFT; and
the distal section surrounds the first lateral surface, the second lateral surface, and the non-media facing surface of the NFT.

18. The apparatus of claim 14, wherein at least the distal section of the resistive sensor is situated to receive at least some of the light coupled to the optical waveguide.

19. The apparatus of claim 14, wherein:
the optical waveguide comprises a first cladding layer, a second cladding layer, and a core disposed between the first and second cladding layers; and
at least a portion of the distal section of the resistive sensor is disposed within one of the first and second cladding layers.

20. The apparatus of claim 14, wherein the resistive sensor comprises a metal wire having a thermal coefficient of resistance.

* * * * *